US008923558B2

(12) United States Patent
Richards

(10) Patent No.: US 8,923,558 B2
(45) Date of Patent: Dec. 30, 2014

(54) MOVING OBJECT DETECTION USING STEREO RECTIFIED IMAGES ACQUIRED FROM A MOVING AIRCRAFT

(75) Inventor: Chet L. Richards, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 13/471,828

(22) Filed: May 15, 2012

(65) Prior Publication Data

US 2013/0308820 A1 Nov. 21, 2013

(51) Int. Cl.
*G06K 9/00* (2006.01)

(52) U.S. Cl.
USPC ......................................... 382/103

(58) Field of Classification Search
None
See application file for complete search history.

(56) References Cited

U.S. PATENT DOCUMENTS

| | | | |
|---|---|---|---|
| 2006/0125920 A1* | 6/2006 | Criminisi et al. | 348/159 |
| 2010/0098293 A1 | 4/2010 | Chandraker et al. | |
| 2012/0127171 A1* | 5/2012 | Li et al. | 345/419 |
| 2013/0089269 A1* | 4/2013 | Barnum et al. | 382/261 |
| 2013/0129148 A1* | 5/2013 | Nanri et al. | 382/103 |
| 2013/0169748 A1* | 7/2013 | Corral-Soto | 348/43 |

FOREIGN PATENT DOCUMENTS

WO WO2012017650 A2 * 2/2012

OTHER PUBLICATIONS

Zhang, Guofeng, et al. "Efficient non-consecutive feature tracking for structure-from-motion." Computer Vision—ECCV 2010. Springer Berlin Heidelberg, 2010. 422-435.*
Loop, Charles, and Zhengyou Zhang. "Computing rectifying homographies for stereo vision." Computer Vision and Pattern Recognition, 1999. IEEE Computer Society Conference on . . . vol. 1. IEEE, 1999.*
Ma Y et al., "Reconstruction from Two Uncalibrated Views", Dec. 13, 2003, An Invitation to 3-D Vision, Springer Verla, Berlin, pp. 171-227.

* cited by examiner

*Primary Examiner* — Nirav G Patel
(74) *Attorney, Agent, or Firm* — Burns & Levinson LLP; Joseph M. Maraia; Weber Hsiao

(57) ABSTRACT

A motion detecting engine is provided. Given a pair of stereo rectified images in which the stereo rectified images are taken at different times from one or more sensors that are oriented perpendicular to a stereo baseline and parallel to each other, for each feature in one of the stereo rectified images, the motion detecting engine associates a subject feature with the same feature in the other stereo rectified image to form a feature association. For each feature association, the motion detecting engine forms a feature motion track following a subject feature association from one of the stereo rectified images to the other stereo rectified image. The motion detecting engine then differentiates feature motion tracks from other feature motion tracks that are parallel to the stereo baseline. The feature motion tracks being differentiated by the motion detecting engine represent detected objects that are moving with respect to the ground.

17 Claims, 8 Drawing Sheets

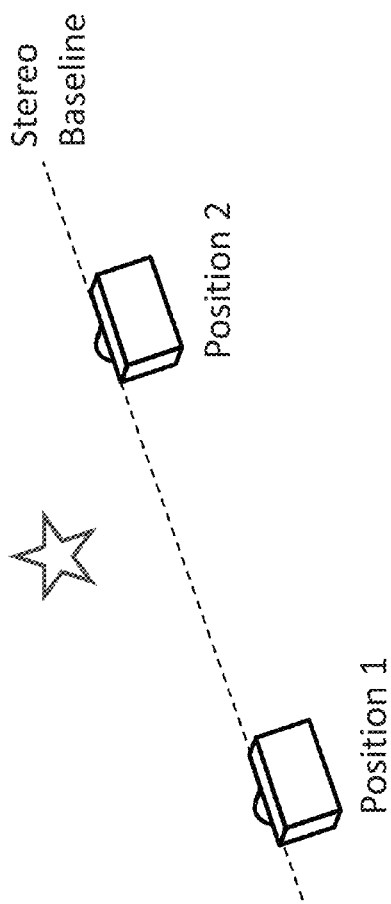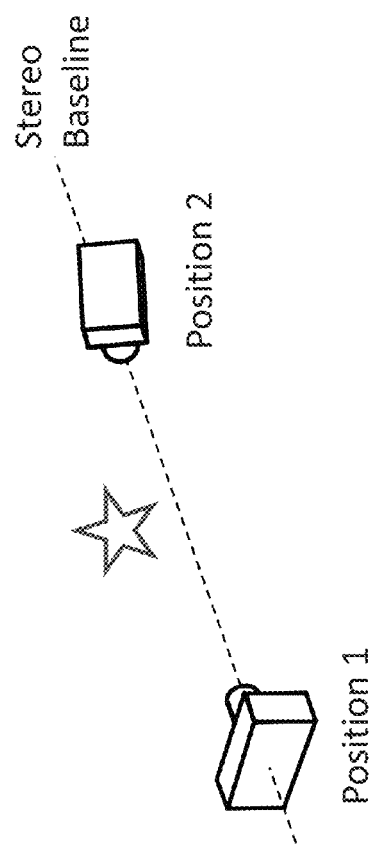
FIG. 5
FIG. 6

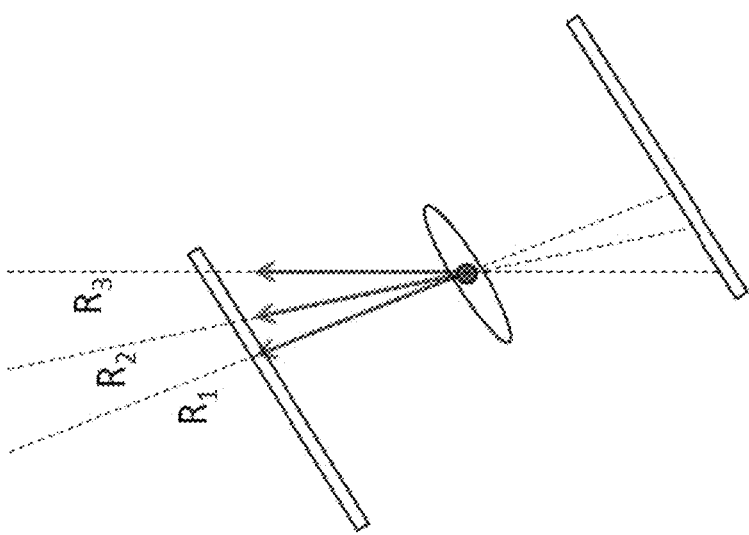
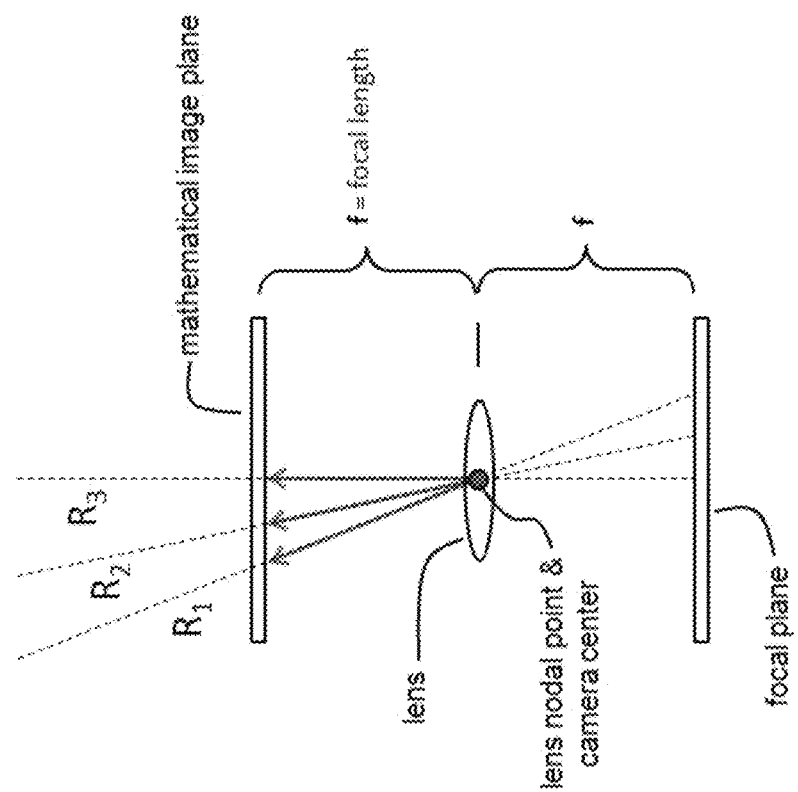
FIG. 7

MOVING OBJECT DETECTION USING STEREO RECTIFIED IMAGES ACQUIRED FROM A MOVING AIRCRAFT

BACKGROUND

A significant task, common in real-time image processing, is to detect objects that are moving with respect to stationary landscape. In particular, there is a need for a simplified method of detecting these moving objects when viewed by imaging sensors mounted on an aircraft in flight.

Historically, the preferred method of detecting moving objects is "frame subtraction." The frame subtraction process takes two images, obtained with a time delay between them, registers them so that stationary features are mutually aligned, and subtracts one image from its companion. This difference will show changes, such as due to motion, as either positive or negative values. In many cases frame subtraction does not work well because motion of the camera induces significant parallax shifts which gives even stationary objects the appearance of "motion." Further, the camera may change its orientation between the images, which also induces false motion of stationary objects.

A solution to the aforementioned problem has long been known. The technique is to select trackable stationary (i.e. terrain) features from the images and use these features to model the changes associated with all the stationary objects. In effect, the apparent movement of these stationary features provides information about the contours and perspective distortions of the observed terrain (including structures, such as buildings, trees, etc.). Once the terrain model has been established, it can be used to warp one of the images so that stationary features in the warped image overlay the corresponding stationary features in its companion image. Once this has been done, subtracting one frame from its companion reliably reveals objects which are moving with respect to the stationary terrain.

There are simplified versions of the foregoing modeling technique. One approach is to assume that the ground is essentially flat (true for most local observations). This ground plane approach provides the basic reference for the warping. In general, the ground plane approach stretches away from the camera so that a perspective distortion is inherent in the image of the ground plane. The benefit of this approach is that the ground plane seen by one camera is readily warped to match the same ground region as seen by the companion camera. The technique is well known in the literature as a "homography transformation."

Structures which stick up from the ground plane are not warped the same way as the ground plane. These structures "sway" in such a way that their bases, which are on the ground plane, warp properly under homography. However, their elevated portions move in the imagery according to the rules of differential parallax. This apparent sway motion causes leakage during the frame subtraction which can defeat the detection of truly moving objects. One solution is to provide spatial filters which detect the spatial properties of these swaying objects and rejects them from the final frame subtraction.

The foregoing techniques of frame subtraction and warping as well as other conventional techniques for detecting true moving objects from aerial imagery, however, are computationally intensive.

SUMMARY

Described herein are techniques and devices for detecting moving objects using stereo rectified images. In particular, moving objects are detected in images that include stationary objects, some of which may be vertical structures.

In some aspects, this disclosure provides a process including given a pair of stereo rectified images in which the stereo rectified images are taken at different times from one or more sensors that are oriented perpendicular to a stereo baseline and parallel to each other, for each feature in one of the stereo rectified images, associating a subject feature with the same feature in the other stereo rectified image forming a feature association. The process includes, for each feature association, forming a feature motion track following a subject feature association from one of the stereo rectified images to the other stereo rectified image. The process includes differentiating feature motion tracks from other feature motion tracks that are parallel to the stereo baseline, the feature motion tracks being differentiated representing detected objects moving with respect to the ground.

In some aspects, this disclosure provides a system including one or more modules configured to perform the operations of, given a pair of stereo rectified images in which the stereo rectified images are taken at different times from one or more sensors that are oriented perpendicular to a stereo baseline and parallel to each other, for each feature in one of the stereo rectified images, associating a subject feature with the same feature in the other stereo rectified image forming a feature association. The one or more modules are also configured to perform the operations of, for each feature association, forming a feature motion track following a subject feature association from one of the stereo rectified images to the other stereo rectified image. The one or more modules are also configured to perform the operations of differentiating feature motion tracks from other feature motion tracks that are parallel to the stereo baseline, the feature motion tracks being differentiated representing detected objects moving with respect to the ground.

In some aspects, this disclosure provides a computer-readable storage medium encoded with instructions, that when executed by a data processing apparatus, cause the data processing apparatus to, given a pair of stereo rectified images in which the stereo rectified images are taken at different times from one or more sensors that are oriented perpendicular to a stereo baseline and parallel to each other, for each feature in one of the stereo rectified images, associate a subject feature with the same feature in the other stereo rectified image forming a feature association. The data processing apparatus is also caused to, for each feature association, form a feature motion track following a subject feature association from one of the stereo rectified images to the other stereo rectified image. The data processing apparatus is also caused to differentiate feature motion tracks from other feature motion tracks that are parallel to the stereo baseline, the feature motion tracks being differentiated representing detected objects moving with respect to the ground.

In other examples, any of the aspects above can include one or more of the following features.

In some examples, the associating step includes, given a sequence of intermediary images between the pair of stereo rectified images, associating the subject feature in one intermediary image to the same feature in a successive image to maintain the subject feature association.

In other examples, the differentiating step includes, for each feature motion track formed, calculating the slope of a subject feature motion track.

In some examples, the method further includes, given a pair of images, stereo rectifying the pair of images using homographic transformation.

In other examples, the method further includes changing the stereo baseline over a sequence of different pairs of stereo rectified images to resolve ambiguous feature motions tracks that represent objects both moving with respect to the ground and stationary with respect to the ground.

In some examples, the method further includes receiving the pair of stereo rectified images from the one or more sensors.

In other examples, the method further includes eliminating stationary objects from a scene based on the feature motion tracks being differentiated from the other feature motion tracks that are parallel to the stereo baseline.

In some examples, the association module is further configured to, given a sequence of intermediary images between the pair of stereo rectified images, associate the subject feature in one intermediary image to the same feature in a successive image to maintain the subject feature association.

In other examples, the differentiation module is further configured to, for each feature motion track formed, calculate the slope of a subject feature motion track.

In some examples, the system further includes a stereo rectification module configured to, given a pair images, stereo rectify the pair of images using a homographic transformation.

In other examples, the system further includes a stereo baseline module configured to change the stereo baseline over a sequence of different pairs of stereo rectified images to resolve ambiguous feature motions tracks that represent both objects moving with respect to the ground and stationary with respect to the ground.

In some examples, the system further includes a receiver configured to receive the pair of stereo rectified images from the one or more sensors.

In other examples, the system further includes a receiver configured to access a data store and receive the pair of stereo rectified images, the data store storing the pair of stereo rectified images together with other pairs of stereo rectified images.

In some examples, the system further includes an elimination module configured to eliminate stationary objects from a scene based on the feature motion tracks being differentiated from other feature motion tracks that are parallel to the stereo baseline.

The techniques and devices described herein can provide one or more the following advantages. An advantage of the technology is that, for example, a car traveling along the ground can be detected from the air and discriminated against the many high-rises found in a city. Another advantage of the technology is that features representing objects in images are processed, which is less computational intensive than manipulating whole images. Yet another advantage of the technology is that ambiguous feature motion tracks are resolved to detect "true" moving objects.

BRIEF DESCRIPTION OF THE DRAWINGS

FIG. 5 is a diagram of a camera in two positions that are stereo rectified.

FIG. 6 is a diagram of a camera in two positions that are arbitrarily orientated.

FIG. 7 is a diagram of an abstract camera in two different orientations.

DESCRIPTION

As an overview to the processes and corresponding apparatuses for detecting moving objects described below, hereinafter the "technology," the technology includes a motion detecting engine identifying stationary objects and moving objects from the "motions" of both stationary and moving objects, as observed by one or more stereo rectified cameras. To clarify, while stationary objects are fixed to the ground and do not move in reality, to an observer who is moving, these stationary objects do appear to "move," if only in the imagery. This apparent motion is called "parallax motion."

In operation, for example, the motion detecting engine detects moving objects by identifying features representing both stationary objects and moving objects, and the respective motions of these objects from a pair of stereo rectified images or "stereo pairs." Motion lines representing the motion of stationary objects consist entirely of parallel lines. In contrast, motion lines representing the motion of moving objects are mostly tilted with respect to those of stationary objects. The foregoing properties are true regardless of whether or not the objects lie on or off a plane (i.e., two-dimensional or three-dimensional space. Advantageously, the motion detecting engine, installed in an aircraft, using stereo pairs can detect, from the air, a car traveling along the ground and can discriminate against the many high-rises found in a city, for example.

Figure 1:
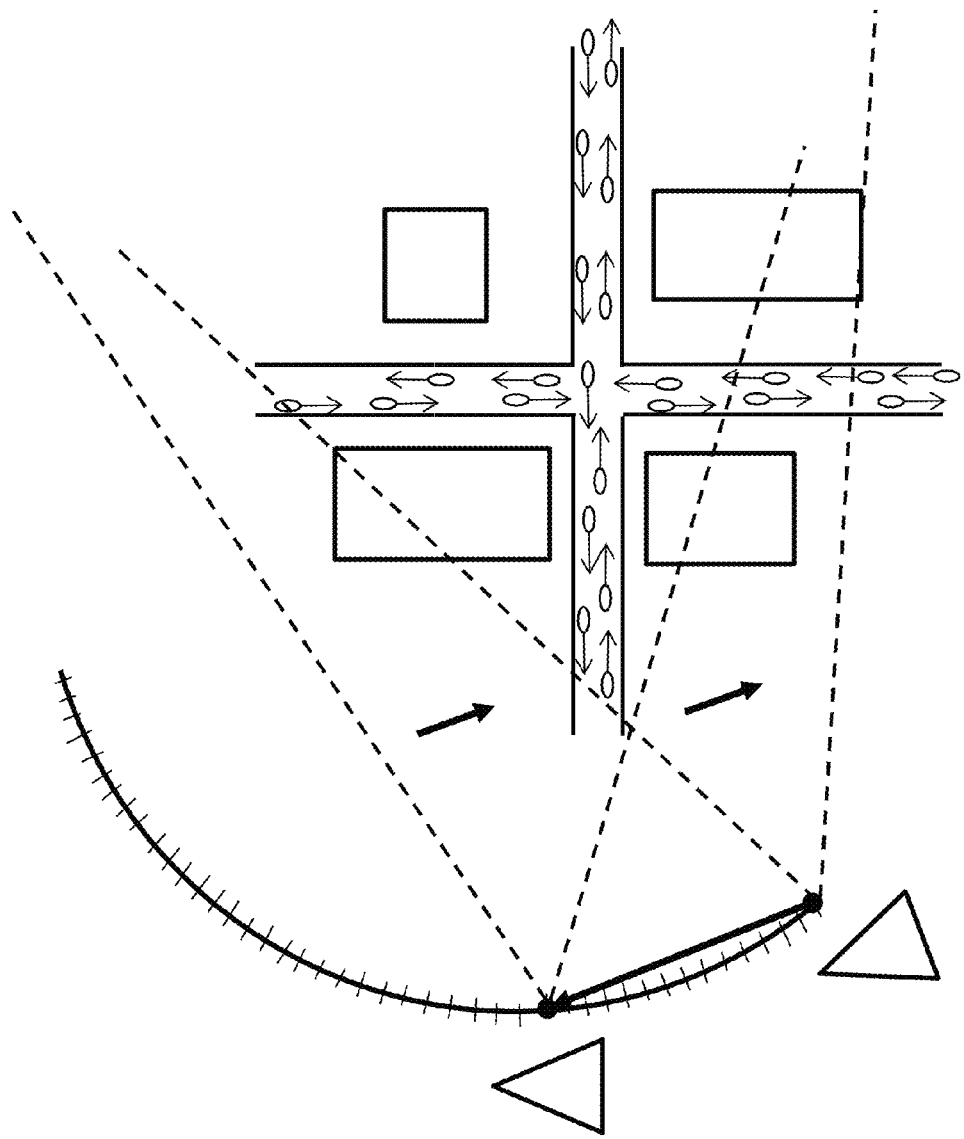
FIG. 1 is a plan view diagram of an example motion detecting scenario in which examples of a motion detecting engine may be used.

FIG. 1 shows a vertical view (overhead view) of an example scene 100 including stationary objects 105 (e.g., buildings and other structures fixed to the ground) and moving objects 110 (e.g., vehicles, people, and other objects moving relative to the ground). In the scene 100, an aircraft 115 flies above the object 105, 110 along some general path 116. In a surveillance application, the path 116 is typically a circle around some point on the ground but other flight path patterns are possible. The foregoing example also applies to other civilian and military applications including moving target detection, moving target tracking, situational awareness, persistent surveillance, and traffic monitoring to name a few.

The aircraft 115 is equipped with a sensor 120, such as a camera, and a motion detecting engine 125. In this example, the aircraft 115 traverses the circular surveying path 116 on the left of FIG. 1. Each "tick" mark (generally referenced as 117) on the circular surveying path 116 represents the sensor 120 capturing an image. Two images are taken from a sequence of images spaced some distance and time apart, which are denoted in FIG. 1, as P1 and P2.

The images taken at P1 and P2 are stereo rectified in a procedure described later in greater detail. These images are at the beginning and end of a sensor motion arrow 130. The sensor motion arrow 130 defines a stereo baseline between the beginning and ending images. Each of the stereo rectified images represents a somewhat different view of the scene 100, as represented by the diverging dotted lines 135 and 140.

The motion detecting engine 125 represents the stationary objects 105 and moving objects 110 in each of the stereo rectified images as image features or simply "features," such as edges, corners, and blobs. For each feature in one of the stereo rectified images, the motion detecting engine 125 associates a subject feature with the same feature in the other stereo rectified image to form a feature association. In this regard, the motion detecting engine 125 advantageously processes features representing objects in images, which is less computational intensive than manipulating whole images.

In practice, the sensor 120 in the aircraft 115 records a rapid sequence of photographs, much like a movie camera. In this case, the features move very little between image "frames" and the feature associations are readily maintained over the entire course of movement of the camera. In many aerial photography scenarios, such as surveillance and traffic monitoring, a rapid stream of images is commonly available.

In some examples, given a sequence of images including the pair of stereo rectified images and intermediary images therein between, the motion detecting engine 125 associates a subject feature in one intermediary image to the same feature in one or more successive images to obtain and/or maintain a feature association. In this regard, the motion detecting engine 125 can advantageously associate features that may be not observable by the sensor 120 at all sensor positions but may be obstructed by other objects in some sensor positions. For example, in one image or frame, a moving car is observed traveling in such a way as to pass behind a building. In a next frame, the building completely obstructs the view of the moving car. In a still next frame, the moving car is observed emerging from behind the building. In this example, the motion detecting engine 125 uses these frames to associate features representing the moving car.

For each feature association, the motion detecting engine 125 forms a feature motion track following a subject feature association from one of the stereo rectified images to the other stereo rectified image. The feature motion tracks represent the movement of features caused by either parallax motion (i.e., the apparent movement of an object caused by moving a camera) or a combination of parallax motion and an object moving with respect to stationary ground, herein referred to as the "true" motion of a moving object.

Although examples of the motion detecting engine 125 are described as being part of or installed on the aircraft 115, in some examples, the motion detecting engine 125 is separated from the aircraft 115 (e.g., installed on another aircraft). In some examples, the motion detecting engine 125 is part of a ground controller that is communicating with the aircraft 115. Images or stereo rectified images taken by the sensor(s) 120 on the aircraft 115 are communicated to the ground controller and then the motion detecting engine 125 processes the images, as described above.

Figure 2:
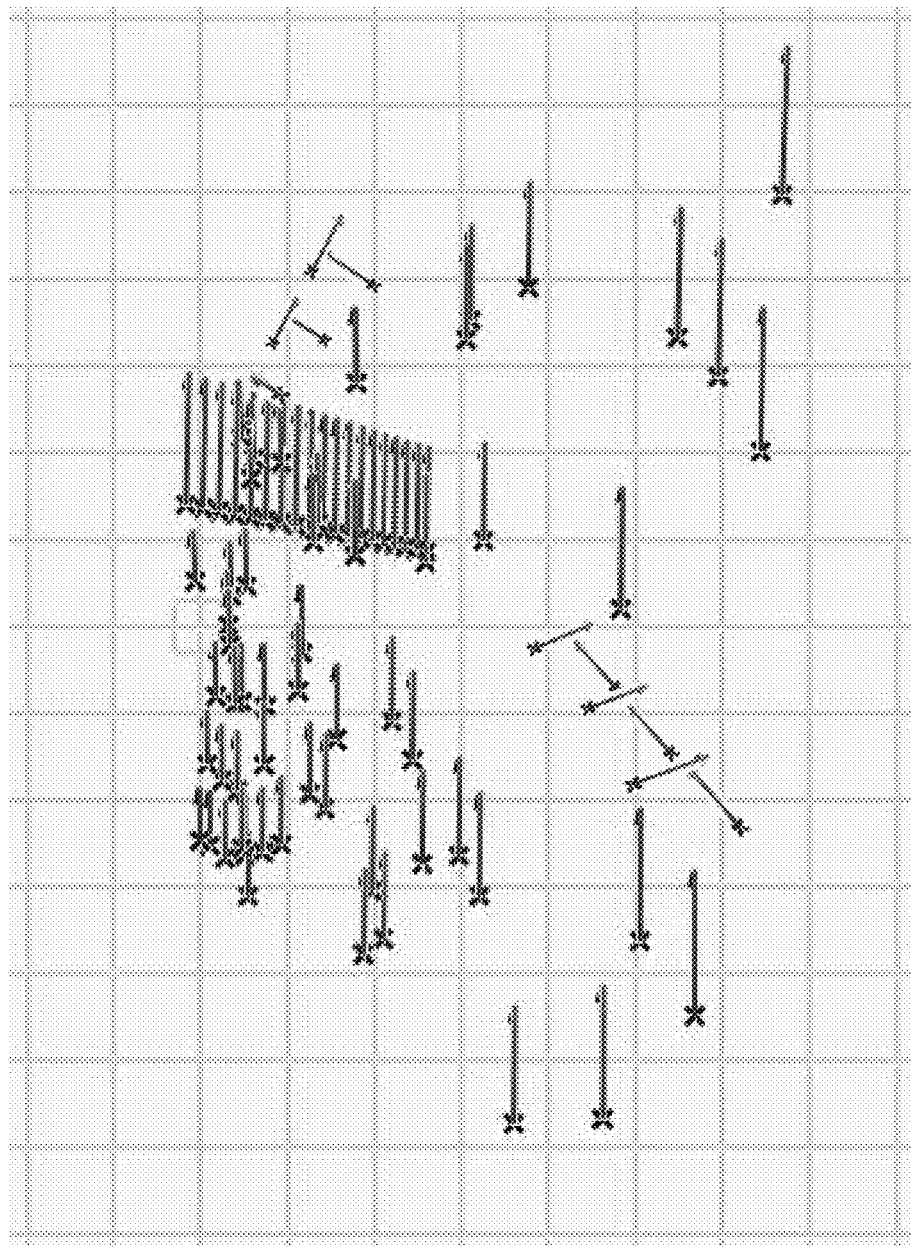
FIG. 2 is a diagram showing feature motion tracks formed by the motion detecting engine.

FIG. 2 shows with respect to a stereo baseline 200, the feature motion tracks formed by the motion detecting engine 125 of FIG. 1 as motion flow lines or "streaks," of which lines 205, 210, 215, 220, 225, 230, 235, and 240 are discussed in detail. The length of a motion flow line indicates the amount of apparent parallax motion, or true motion, of a feature. The apparent parallax motion of foreground features is greater than that of more distant features. As such, the motion flow lines, for stationary objects of features representing the foreground objects (e.g., 205) are longer in length than the motion flow lines of features representing the background object (e.g., 210). Motion flow lines of about the same length represent objects at about the same distance (e.g., 215 and 220).

FIG. 2 shows with respect to the stereo baseline 200, the feature motion tracks, 225 and 230, corresponding to a vertical structure formed by the motion detecting engine 125. The vertical structure has progressively changing flow lengths with motion flow lines at the bottom (e.g., 225) of the structure being shorter than those at the top (e.g., 230). The motion flow lines for the vertical structure are as such because as the aircraft 120 flies above the vertical structure, the top of the structure is closer to the camera than the bottom, and therefore, the top motion flow lines (e.g., 230) are longer that the bottom motion flow lines (e.g., 225). In this regard, the motion detecting engine 125 advantageously addresses and/or eliminates "false" motion of stationary objects that can defeat the detection of truly moving objects.

Motion flow lines (e.g., 205) that are parallel (horizontal) and lie parallel to the stereo baseline 200 indicate features representing stationary objects. Motion flow lines that are not parallel to the stereo baseline 200, shown in FIG. 2 as "slanted" lines (e.g., 235 and 240) indicate features representing moving objects. In other words, moving objects, such as traffic, move at angles with respect to the flow of features of stationary objects. For ease of reference, the motion flow lines of moving objects are called "traffic flow lines."

The length and direction of traffic flow lines depend on both the location of moving objects in the scene (i.e., the further away, the shorter the motion flow line) and on the relative velocity of these moving objects. In some examples, for moving objects, the composite motion flow line is the vector sum of the parallax motion due to the motion of the sensor and the true velocity vector of the moving object. In other examples, the motion detecting engine 125 compares successive stereo pairs to determine the velocities of the moving objects as well as their location and direction of motion. In FIG. 2, for example, the traffic flow line 235 represents receding traffic and traffic flow line 240 represents approaching traffic.

The motion detecting engine 125 differentiates feature motion tracks from other feature motion tracks that are parallel to the stereo baseline 200. The differentiated feature motion tracks represent detected objects moving with respect to the ground. In some examples, the motion detecting engine 125 calculates the slope of each feature motion track. When the motion detecting engine 125 calculates a slope of zero for a given feature motion track (e.g., 205), the motion detecting engine 125 identifies the given feature motion track as being parallel to the stereo baseline 200, and thus, the track is provisionally assumed to be a feature of a stationary object. In some examples, subsequent observations confirm the stationary objects and positively identify objects with temporarily ambiguous motions.

When the motion detecting engine 125 calculates a non-zero slope (positive or negative) for a given feature motion track (e.g., 235 and 240), the motion detecting engine 125 identifies the given feature motion track as being not parallel to the stereo baseline 200, and thus, the motion detecting engine determines that the track corresponds to a feature of a moving object. The motion detecting engine 125 advantageously uses less computing resources (e.g., processing time and memory) to separate moving objects from stationary object, as described above, than is required to warp one image onto another and then subtract the image from the other image. In this regard, the motion detecting engine 125 may be implemented, for example, by a cheaper and/or less powerful processor and/or computer.

FIGS. 3A-3D shows a sequence of observations (labeled Observation 1 through 4) as an aircraft moves along a circular path from the point of view of stationary objects on the ground. Note that parallax motion arrows 305a-d, generally referenced as 305, change direction as the aircraft moves along its flight path (clockwise in FIGS. 3A-3D). This is important because it means that the parallax motion flow lines 305 will, in most cases, not be parallel to the moving traffic flow lines 310a-d, generally referenced as 310. A close examination of the scenario sequence shows that the second case from the left in FIG. 3B (Observation 2) has the ground parallax motion flow 305b being almost parallel to one of the traffic streams 310b. However, as the aircraft traverses the circle, this case proves to be ephemeral. These changes in the motion flow vectors reveal the moving objects and resolve the motion ambiguities mentioned elsewhere (in paragraph 0034, above, and paragraph 0037, below).

Figure 3:
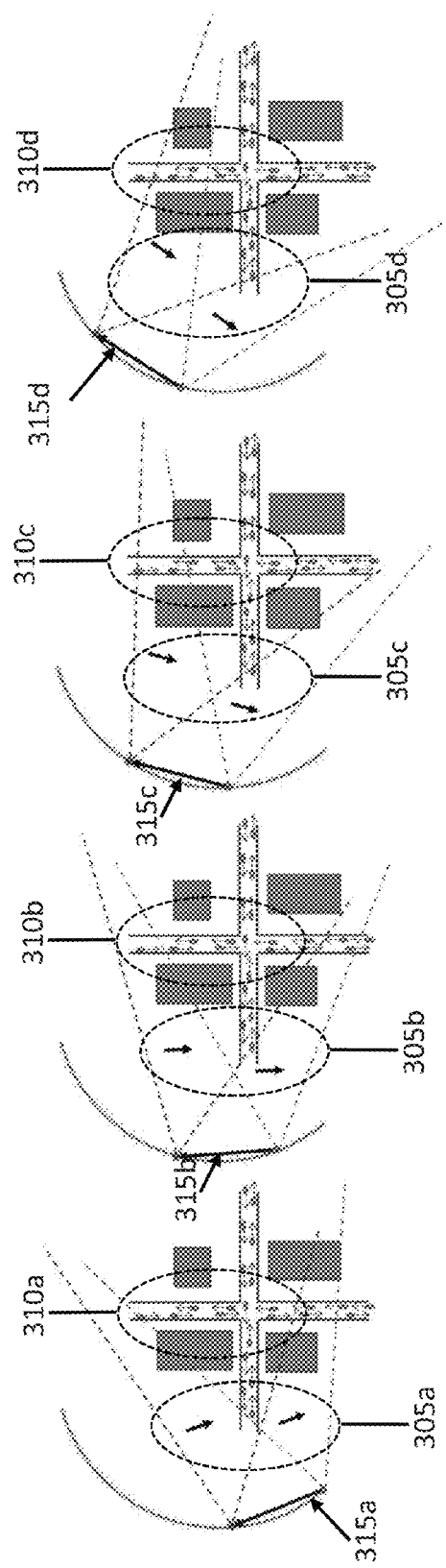
FIGS. 3A-3D are diagrams of a sequence of observations taken from an aircraft from the point of view of stationary ground objects.
Figure 4:
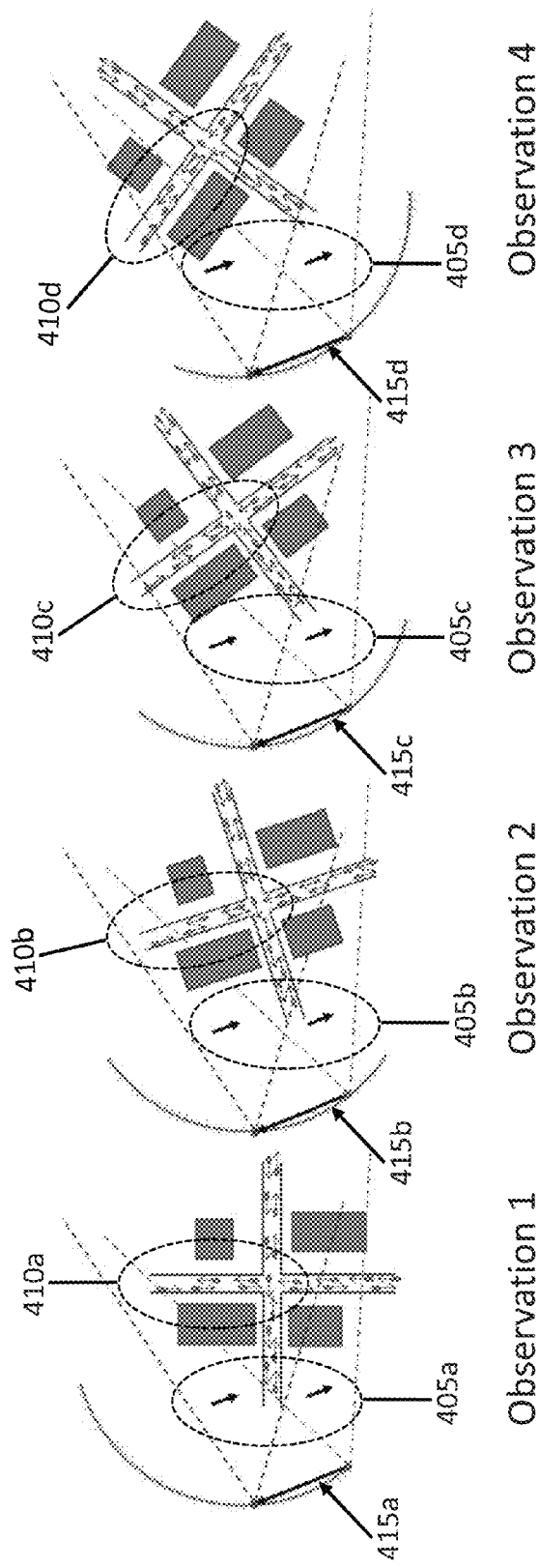
FIGS. 4A-4D are diagrams of a sequence of observations taken from an aircraft from the point of view of the aircraft.

As illustrated by FIGS. 3A-3D, the feature motion track of the feature may be non-parallel in one stereo pair (FIG. 3A, Observation 1) and then parallel in another stereo pair (FIG. 3B, Observation 2). As such, it is not clear whether the feature represents a stationary object or moving object. In some examples, the motion detecting engine 125 resolves the ambiguous (anomalous) feature motion track by comparing the feature motion tracks of features from the one observation with the feature motion tracks of the same features from a preceding (or succeeding) observation in a sequence of observations.

In another example, the motion detecting engine 125 changes a stereo baseline 315a-d, generally referenced as 315, over a sequence of different pairs of stereo rectified images (observations) to resolve ambiguous feature motions tracks. The motion detecting engine 125 then compares the feature motion tracks of features from one observation with the feature motion tracks of the same features from another observation in which the stereo baseline changed.

Based on the comparison, the motion detecting engine 125 determines which of the feature motion tracks that are parallel in one observation change to non-parallel in another observation, or vice versa. The motion detecting engine 125 then resolves ambiguous feature motion tracks based on the determined change in feature motion track. By resolving ambiguous feature motion tracks, the motion detecting engine 125 advantageously detects "true" moving objects.

In another example, the resolution process described above involves the motion detecting engine 125 comparing feature motion tracks from several observations (i.e., several stereo pairs). In yet another example, for each feature, the motion detecting engine 125 keeps track of the "status" of a corresponding feature motion track (i.e., parallel or not parallel) over several observations.

FIGS. 4A-4D shows a similar sequence of observations shown in FIGS. 3A-3D but from the point of view of the aircraft. In this sequence, the scene rotates with respect to the camera position pair. Thus, each stereo image pair (observation) will view a different orientation of the objects in the scene. However, the motion flow lines of features in the scene will still have the desired properties. That is, stationary objects will have motion flow vectors (lines) 405a-d that are parallel to a stereo baseline 415a-d of the camera position pair. Whereas, moving traffic will have motion flow vectors (lines) 410a-d that are, in most cases, not parallel to the stereo baseline 415a-d.

In the foregoing examples, the motion detecting engine 125 is provided a pair of stereo rectified images from which to detect moving objects. In another example, the motion detecting engine 125 stereo rectifies a pair of images using homography to produce a stereo pair. The following describes the process of homographic transformation, as may be implemented by the motion detecting engine 125.

By way of introduction, FIG. 5 shows a camera in two positions that are stereo rectified, that is, the positions are oriented parallel to each other and perpendicular to the stereo baseline between them. This is the "ideal" or theoretical case.

Typically, however, the camera positions are arbitrarily oriented. Consider the following scenario of interest involving an aircraft with a camera flying along some general path. Because the aircraft does not fly along a perfectly straight path, and the aircraft is subject to oscillations in roll, pitch and yaw, the orientation of the installed camera changes with time resulting in a situation much like the one shown in FIG. 6.

In FIG. 6, the camera substantially reorients as it moves from the first position to the second. In this typical case, the camera, in its two positions, will not form a stereo rectified pair of images. In practice, the images delivered by the two camera positions can be stereo rectified through homographic transformations of both images. Derived images are thereby created which are equivalent to what would have been photographed if the camera positions had been physically stereo rectified (as described in reference to FIG. 5).

Homography is a mathematical technique for mapping the contents of one plane onto another plane. The technique can also be considered a type of perspective transformation. In some examples, the motion detecting engine 125 uses homography to create a new image which is the equivalent of a virtual rotation of the camera. In other words, the motion detecting engine 125 provides an image which is equivalent to that which would have been formed if the camera had been pointed in a different direction. FIG. 7, discussed below, illustrates the geometry of this rotation.

FIG. 7 shows an abstract camera in two different orientations (positions). In a physical camera, the focal plane lies behind the lens. Physically the image is inverted. Mathematicians replicate the focal plane with an "image plane" which lies in front of the lens. This is a convenience for it maintains an upright projection from the far field to the image plane. In a physical camera, the nodal point within the lens acts as a kind of local coordinate system origin. In mathematical terms, this is called the "camera center." The focal length of the camera is denoted by, f.

FIG. 7 shows a case in which three rays, $R_1$, $R_2$ and $R_3$, are projected from the camera center of the left camera (position 1), to three distant objects. Note the arrows which measure the distances from the camera center to the image plane (and to the focal plane). The right camera (position 2) has been rotated counterclockwise through some angle. The rays are the same. However, the distances of these rays from the camera center to the image plane are now different. The arrows show the change in the distance to the intercepts of the image plane. The consequence is that the image in the right camera (position 2) will differ from that in the left camera (position 1).

A non linear transformation, or mapping, is needed to couple from the left image (position 1) to the right image (position 2). The mapping equation, in its general form, is given by:

$$\begin{bmatrix} x_2 \\ y_2 \\ f \end{bmatrix} = \frac{f}{a_{31}x_1 + a_{32}y_1 + a_{33}f} \begin{bmatrix} a_{11} & a_{12} & a_{31} \\ a_{21} & a_{22} & a_{23} \\ a_{31} & a_{32} & a_{33} \end{bmatrix} \begin{bmatrix} x_1 \\ y_1 \\ f \end{bmatrix} \quad (1)$$

The coefficients, $a_{ij}$, of the transformation matrix are the usual Euler angle combinations of sines and cosines for the pan, tilt and roll angles of the camera rotation from the first orientation (position) to the second. The fraction in front of the matrix defines a point by point distortion of the image during the mapping from the first position to the second. This fraction has the property that it keeps the focal length constant and it also discovers the intercepts of the rays with the new image plane.

In some examples, in which true camera orientations are known with respect to an external coordinate system, the motion detecting engine 125 determines the relative pan, tilt and roll angles of one of the two camera positions with respect to the other. In a convenient example, one or more initial measuring units (IMUs) provide the foregoing angles (or measurements thereof) to the motion detecting engine 125. The orientation of both positions is expressed in a common external coordinate system. From these relative angles, the Euler transformations needed to create the coefficients of the aforementioned equation are readily determined by the motion detecting engine 125.

In another example, in which true camera orientations are unknown, or only approximately known, the motion detecting engine 125 may use any one of the techniques for rectification developed within the mathematical discipline of "Multiview Geometry."

Figure 8:
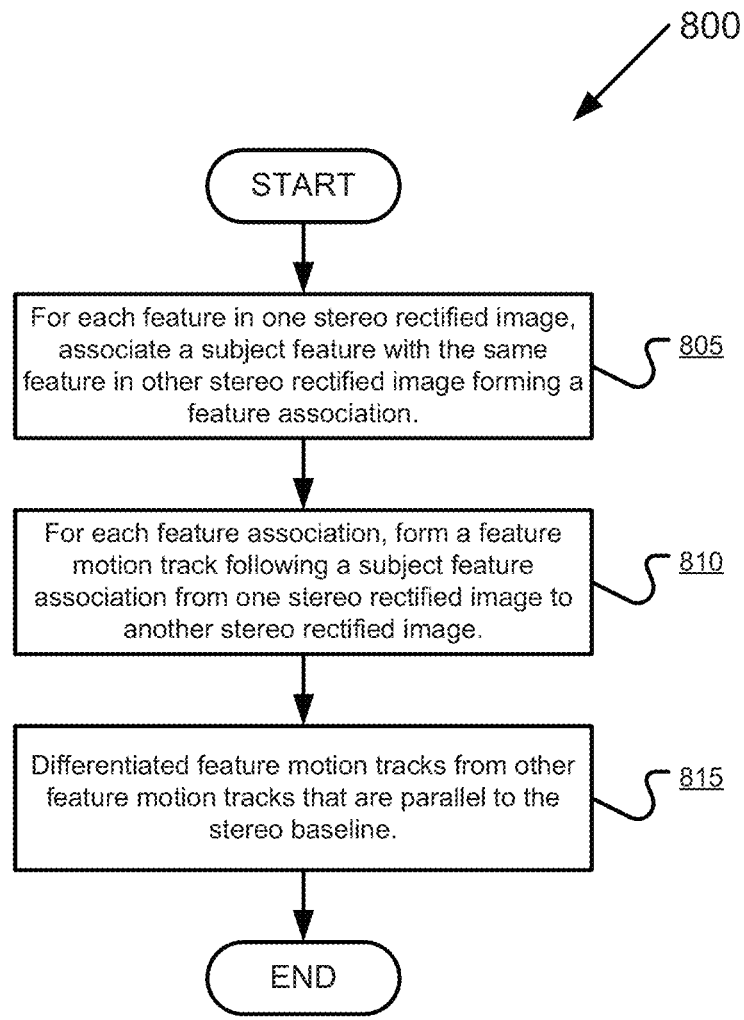
FIG. 8 is a flowchart of an example motion detecting procedure.

FIG. 8 shows an example motion detecting procedure 800 using, for example, the motion detecting engine 125 of FIG. 1. The motion detecting engine 125 is provided with a pair of stereo rectified images. The images are taken at different times and at different positions that are oriented perpendicular to a stereo baseline and parallel to each other. Given this pair of stereo rectified images, the motion detecting engine 125, for each feature in one of the images, associates (805) a subject feature with the same feature in the other stereo rectified image to form a feature association.

For each feature association formed, the motion detecting engine 125 forms (810) a feature motion track that follows a subject feature association from one of the stereo rectified images to the other stereo rectified image. The motion detecting engine 125 then differentiates (815) feature motion tracks from other feature motion tracks that are parallel to the stereo baseline. The differentiated feature motion tracks represent detected objects moving with respect to the ground. In some examples, the motion detecting engine 125 returns the detected moving objects (or representation or indication thereof) to a user.

Figure 9:
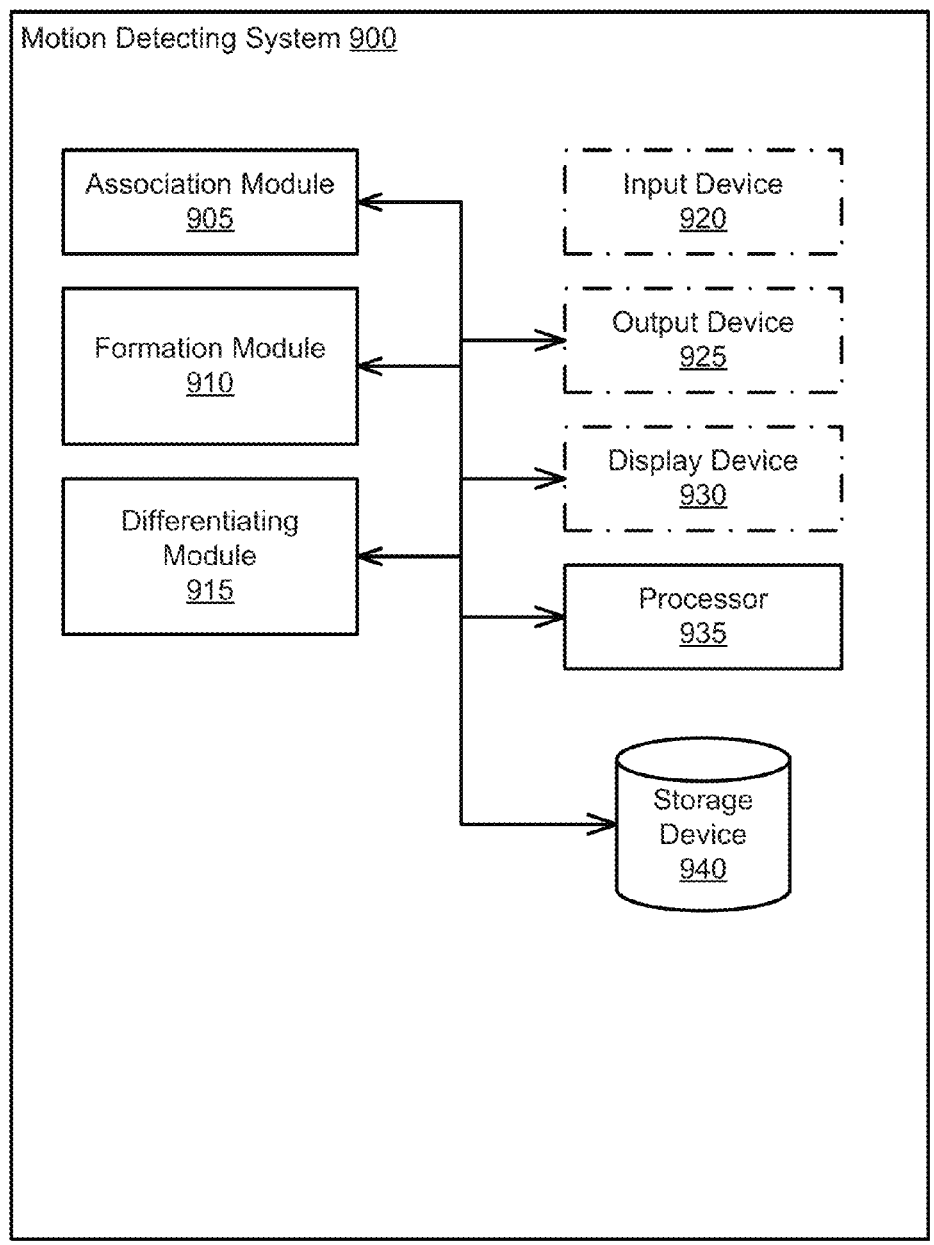
FIG. 9 is a block diagram of an example motion detecting system.

FIG. 9 shows an example system 900 for implementing a motion detecting procedure, such as the one shown in reference to FIG. 8. The system 900 includes an association module 905, formation module 910, differentiation module 915, input device 920, output device 925, display device 930, processor 935, and storage device 940, communicatively coupled to each other, as shown in FIG. 9.

The modules and devices described herein can, for example, utilize the processor 935 to execute computer executable instructions and/or include a processor to execute computer executable instructions (e.g., an encryption processing unit, a field programmable gate array processing unit, etc.). It should be understood that the system 900 can include, for example, other modules, devices, and/or processors known in the art and/or varieties of the illustrated modules, devices, and/or processors. The input device 920, output device 925, and/or display device 930 are optional components of the system 900. Although FIG. 9 shows the system 900 as including the separate modules described herein, the modules can be embedded within other modules.

In some examples, the input device 920, such as the sensor 120 of FIG. 1, provides a pair of stereo rectified images to the association module 905. Each image in the pair of stereo rectified images is taken by the input device 920 at different times and at different positions that are oriented perpendicular to a stereo baseline and parallel to each other. In another example, the storage device 940 provides a stored pair of stereo rectified images to the association module 905. The storage device 940, such as a hard drive, stores the pair of stereo rectified images that is being provided along with other pairs of stereo rectified images.

Given the pair of stereo rectified images, for each feature in one of the stereo rectified images, the association module 905 associates a subject feature with the same feature in the other stereo rectified image to form a feature association. For each feature association formed, the formation module 910 forms a feature motion track following a subject feature association from one of the stereo rectified images to the other stereo rectified image.

The differentiation module 915 then differentiates feature motion tracks from other feature motion tracks that are parallel to the stereo baseline. The feature motion tracks that are being differentiated by the differentiation module 915 represent detected objects that are moving with respect to the ground. In some examples, the differentiation module 915 provides the differentiated feature motion tracks or results to the output device 925, which in turn provides the results to a user, for example, as a printout. In another example, the differentiation module 915 provides the results to the display device 930 and the results are displayed to the user.

The above-described examples of the motion detection engine and corresponding systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing examples are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for detecting objects that are moving with respect to the ground from a pair of stereo rectified images, the method comprising;
in a motion detection engine:
provided with a pair of stereo rectified images in which two images are taken by one sensor on a moving aircraft at different times, the sensor at time $P_1$ and the sensor at time $P_2$ oriented perpendicular to a stereo baseline and parallel to each other, for each feature in one of the stereo rectified images, associating a subject feature with the same feature in the other stereo rectified image forming a feature association;
for each feature association, forming a feature motion track following a subject feature association from one of the stereo rectified images to the other stereo rectified image, the feature motion track indicative of motion of an associated feature; and
differentiating feature motion tracks from other feature motion tracks that are in the pair of stereo rectified images and that are parallel to the stereo baseline, the feature motion tracks being differentiated representing detected objects moving with respect to the ground.

2. The method of claim 1 wherein associating the subject feature includes, given a sequence of intermediary images between the pair of stereo rectified images, associating the subject feature in one intermediary image to the same feature in a successive image to maintain the subject feature association.

3. The method of claim 1 wherein differentiating the feature motion tracks includes, for each feature motion track formed, calculating the slope of a subject feature motion track.

4. The method of claim 1 further comprising, given a pair of images, stereo rectifying the pair of images using homographic transformation.

5. The method of claim 1 further comprising changing the stereo baseline over a sequence of different pairs of stereo rectified images to resolve ambiguous feature motions tracks that represent objects both moving with respect to the ground and stationary with respect to the ground.

6. The method of claim 1 further comprising receiving the pair of stereo rectified images from the one or more sensors.

7. The method of claim 1 further comprising receiving the pair of stereo rectified images from a data store storing the pair of stereo rectified images together with other pairs of stereo rectified images.

8. The method of claim 1 further comprising eliminating stationary objects from a scene based on the feature motion tracks being differentiated from the other feature motion tracks that are parallel to the stereo baseline.

9. An apparatus for detecting objects that are moving with respective to the ground from a pair of stereo rectified images, the apparatus comprising:
provided with a pair of stereo rectified images in which two images are taken by one sensor on a moving aircraft at different times, the sensor at time $P_1$ and the sensor at time $P_2$ oriented perpendicular to a stereo baseline and parallel to each other:
an association module configured to, for each feature in one of the stereo rectified images, associate a subject feature with the same feature in the other stereo rectified image forming a feature association;
a formation module communicatively coupled to the association module, the formation module configured to, for each feature association, form a feature motion track following a subject feature association from one of the stereo rectified images to the other stereo rectified image, the feature motion track indicative of motion of an associated feature; and
a differentiation module communicatively coupled to the formation module, the differentiation module configured to differentiate feature motion tracks from other feature motion tracks that are in the pair of stereo rectified images and that are parallel to the stereo baseline, the feature motion tracks being differentiated representing detected objects moving with respect to the ground.

10. The apparatus of claim 9 wherein the association module is further configured to, given a sequence of intermediary images between the pair of stereo rectified images, associate the subject feature in one intermediary image to the same feature in a successive image to maintain the subject feature association.

11. The apparatus of claim 9 wherein the differentiation module is further configured to, for each feature motion track formed, calculate the slope of a subject feature motion track.

12. The apparatus of claim 9 further comprising a stereo rectification module communicatively coupled to the association module, the stereo rectification module configured to, given a pair images, stereo rectify the pair of images using a homographic transformation.

13. The apparatus of claim 9 further comprising a stereo baseline module communicatively coupled to the association module, the stereo baseline module configured to change the stereo baseline over a sequence of different pairs of stereo rectified images to resolve ambiguous feature motions tracks that represent both objects moving with respect to the ground and stationary with respect to the ground.

14. The apparatus of claim 9 further comprising a receiver communicatively coupled to the association module, the receiver configured to receive the pair of stereo rectified images from the one or more sensors.

15. The apparatus of claim 9 further comprising a receiver communicatively coupled to the association module, the receiver configured to access a data store and receive the pair of stereo rectified images, the data store storing the pair of stereo rectified images together with other pairs of stereo rectified images.

16. The apparatus of claim 9 further comprising an elimination module communicatively coupled to the differentiation module, the elimination module configured to eliminate stationary objects from a scene based on the feature motion tracks being differentiated from other feature motion tracks that are parallel to the stereo baseline.

17. A computer program product, tangibly embodied in a non-transitory information carrier, the computer program product including instructions being operable to cause a data processing apparatus to:
provided with a pair of stereo rectified images in which two images are taken by one sensor on a moving aircraft at different times, the sensor at time $P_1$ and the sensor at time $P_2$ perpendicular to a stereo baseline and parallel to each other, for each feature in one of the stereo rectified images, associate a subject feature with the same feature in the other stereo rectified image forming a feature association;
for each feature association, form a feature motion track following a subject feature association from one of the stereo rectified images to the other stereo rectified image, the feature motion track indicative of motion of an associated feature; and
differentiate feature motion tracks from other feature motion tracks that are in the pair of stereo rectified images and that are parallel to the stereo baseline, the feature motion tracks being differentiated representing detected objects moving with respect to the ground.

\* \* \* \* \*